June 21, 1955  W. J. DANIELS  2,711,345
MOTOR VEHICLE ROOF-TRIM
Filed Oct. 2, 1952  3 Sheets-Sheet 1

Inventor
William John Daniels
By
Emery Holcombe & Blair
Attorney

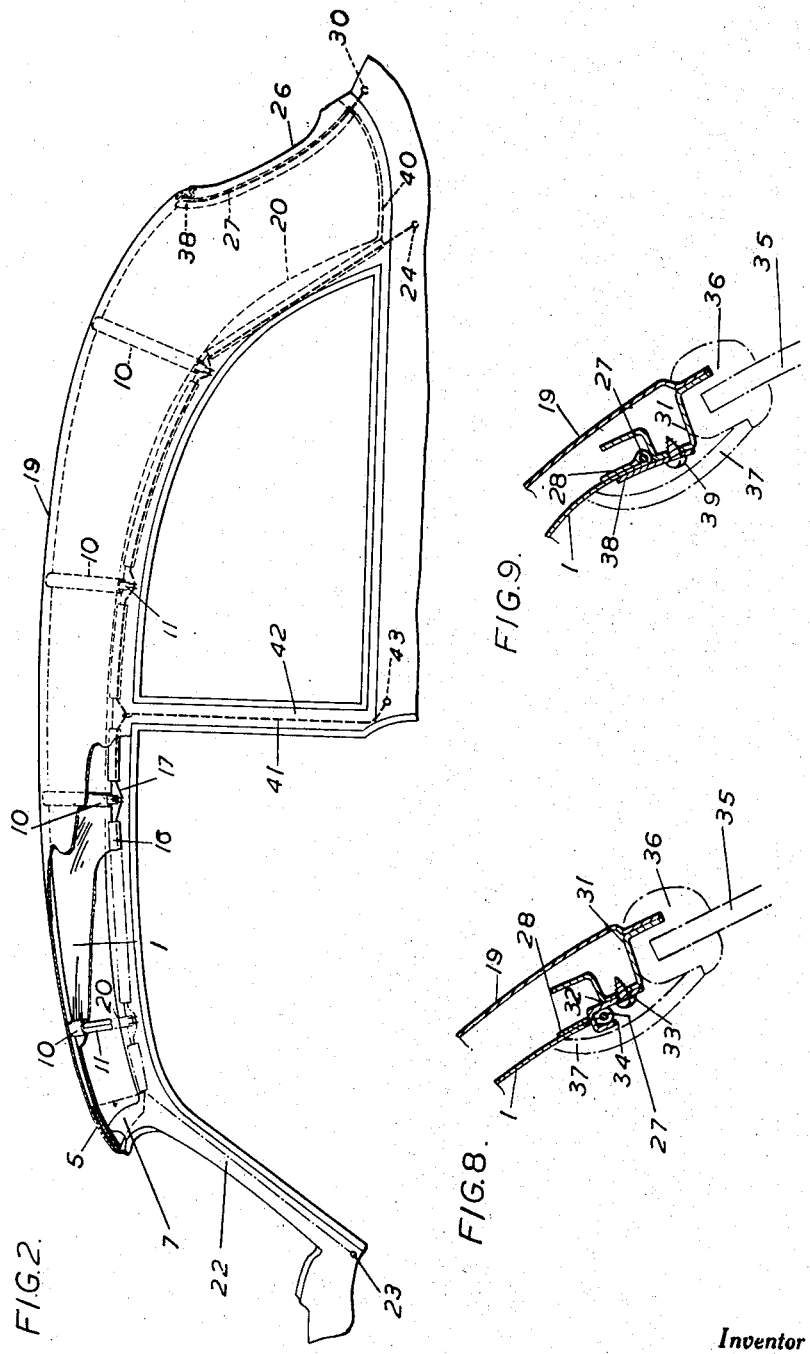

June 21, 1955 W. J. DANIELS 2,711,345
MOTOR VEHICLE ROOF-TRIM
Filed Oct. 2, 1952 3 Sheets-Sheet 3
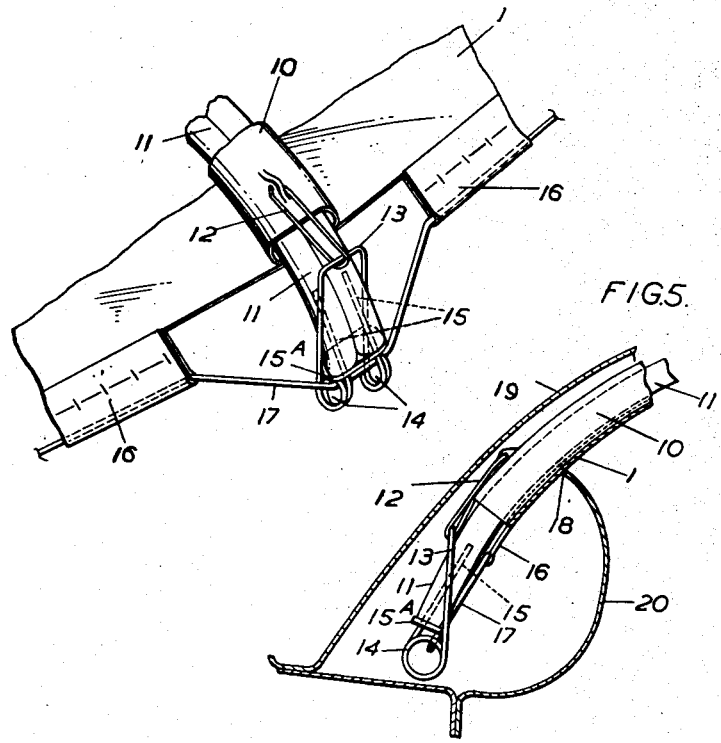
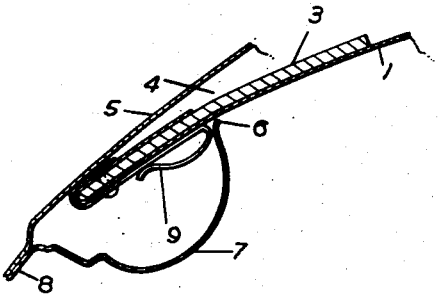
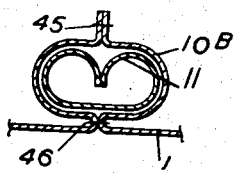
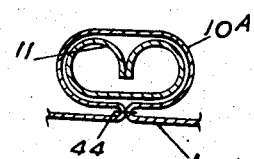
Inventor
William John Daniels
By Emery Holcombe & Blair
Attorney

United States Patent Office 2,711,345
Patented June 21, 1955

2,711,345
MOTOR VEHICLE ROOF-TRIM

William J. Daniels, Headington, England, assignor to Morris Motors Limited, Cowley, England Application October 2, 1952, Serial No. 312,787

5 Claims. (Cl. 296—137)

This invention relates to the trimming of the roofs of motor vehicles, and especially motor cars having pressed steel bodies of the fixed head saloon type.

According to the invention the roof-trim of a motor vehicle is constituted by a prefabricated head lining of textile material, leather cloth or plastic sheeting having its longitudinal edge zones fastened at intervals to the corresponding end portions of transversely disposed, pliable, bow-shaped listing bars which pass through sleeves or loops provided on the reverse of the head lining and are engageable by straining means to tauten the head lining. For example, the two side edges of the head lining can be equipped with a longitudinally arranged wire or cord which engages the corresponding ends of the listing bars and is tensioned between anchorages on the bodywork of the vehicle in order to strain the listing bars and thereby tauten the head lining. It is, of course, necessary that when the head lining has been installed its edges and the associated fixing devices are concealed, in order not to mar the appearance. This requirement can readily be met in the case of vehicles having a continuous slot existing along the front and sides of the roof panel, because the edges of the head lining and the ends of the listing bars can be inserted in the slot and so be hidden from view. In the absence of that feature of the vehicle body structure a finishing strip would have to be fitted to conceal the marginal attachments of the head lining.

Referring now to the accompanying drawings:

Figure 2 is a corresponding side elevation, with the roof panel shown broken away to reveal the arrangement of the roof-trim;

Figure 3 is an enlarged perspective view of a portion of the roof-trim structure;

Figures 4 and 5 are enlarged fragmentary sections on the lines A—A and B—B respectively in Figure 1;

Figures 6 and 7 are enlarged fragmentary cross-sectional views of details of the roof-trim structure; and Figures 8 and 9 are enlarged fragmentary sections on the lines C—C and D—D respectively in Figure 1.

Figure 1:
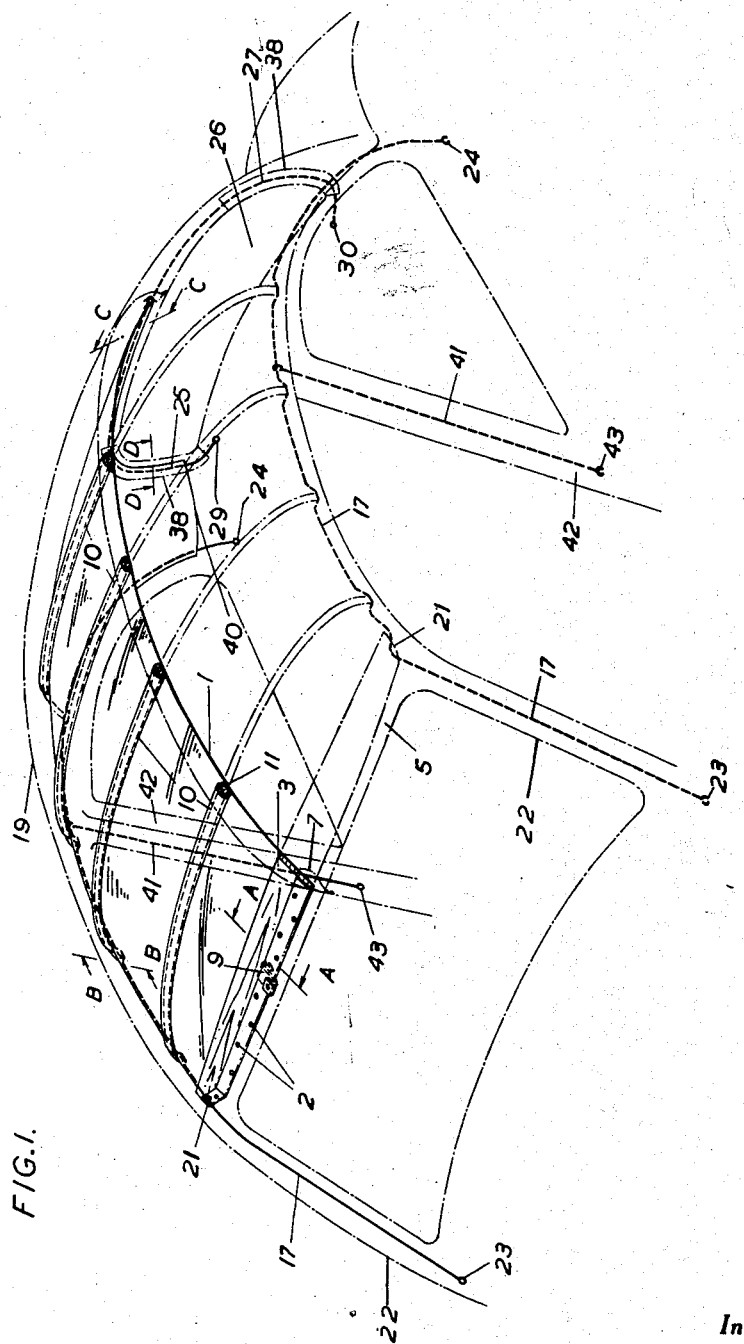
Figure 1 is a diagrammatic phantom perspective view of the upper bodywork of a motor car of the fixed head, pressed steel saloon type fitted with roof-trim in accordance with the invention, the roof-trim being shown in section on the centre line of the vehicle.

The room-trim comprises a prefabricated head lining 1 made by stitching together panels, composed of textile material, leather cloth or plastic sheeting, which have first been cut to the required shape. The front edge zone of the head lining 1 is tacked, as indicated at 2 (Fig. 1), to a plywood board 3 which is located on the reverse of the lining and fits into a slot 4 (Fig. 4) formed between the windscreen header panel 5 and the free edge 6 of a reinforcement member 7 which is united at 8 to the panel 5. The board 3 is fitted with a pair of resilient clips 9 which, as can be appreciated from Figure 4, serve to retain the front part of the roof-trim in the slot 4. The reverse of the lining 1 is formed with transverse sleeves 10 spaced apart substantially parallel to one another and each accommodating a bow-shaped, hollow steel listing bar 11 having the cross-sectional shape shown in Figures 6 and 7. The ends of the listing bars 11 protrude from the sleeves 10 and, in order to effect transverse location of the lining 1, each of the sleeves 10 is tied by a thread or cord 12 to a clip 13 (Fig. 3) made of spring wire. This clip, which is fashioned to present a pair of eyelets 14, has its free ends 15 inserted first through corresponding holes in an abutment plate 15A and then into the corresponding listing bar 11.

The two side edges of the lining 1 are hemmed (Fig. 3), and each hem 16 encloses a length of stranded wire 17 which passes through the eyelets 14. The ends of the listing bars 11, together with the side hems 16 of the head lining, are inserted in a slot 18 (Fig. 5) existing between the roof panel 19 and a member 20 which resembles a cantrail and is termed the roof side inner reinforcement. The slot 18, extending along both sides of the roof panel 19, merges with the ends of the slot 4 across the header panel 5. At the front, each length of wire 17 (Fig. 1) is passed through a guide hole 21 in the corresponding end of the plywood board 3, and then through the associated hollow windscreen pillar 22 to an anchorage 23. By tensioning the two side wires 17 and anchoring their rear ends 24, the listing bars 11 are strained and consequently tauten the head lining 1.

The rearmost panel of the head lining 1 is formed with a cut-out 25 (Fig. 1), conforming to the shape of the backlight opening 26 of the vehicle. A wire 27, enclosed in a hem 28 (Figs. 8 and 9) provided around the cut-out 25, is pulled taut and has its ends anchored at 29 and 30 to the vehicle body structure.

Along its upper portion the surround 31 (Fig. 8) of the backlight opening 26 is provided with a few pointed clips 32 which are fixed in place by screws 33. The tautened head lining 1 is pushed back so that it becomes impaled by the point 34 of each of the clips, and the points 34 are then bent downwardly to retain the lining 1 as indicated. The glass panel 35 of the backlight is mounted by means of the usual glazing strip 36, and the assembly is completed by a finisher strip 37 which conceals the fixing devices. At each of the upright sides of the backlight opening 26 there is a curved metal strip 38 (Figs. 1, 2 and 9). These two strips 38, which serve to retain the adjoining portions of the head lining 1 in place, are secured to the surround 31 by screws 39. Although omitted from the drawings for the sake of clarity, a trim panel of millboard or similar material (covered with the same fabric as that used for the head lining 1) is fitted beneath the backlight opening 26 in order to conceal the rear attachments 24, 29 and 30 of the head lining 1. The trim panel in question is preferably arranged to overlap the edge 40 (Figs. 1 and 2) of the head lining.

In some cases it may be found desirable to supplement the effect of the side wires 17 by attaching to each of them a vertical tension wire 41 (Figs. 1 and 2), which is accommodated within the corresponding centre pillar 42 and is anchored at 43 after having been pulled taut. Whether or not the supplementary tension wires 41 are necessary depends upon the curvature of the roof panel 19 in any given instance.

Different methods of forming the transverse sleeves 10 are exemplified by the constructions designated 10A and 10B in Figures 6 and 7 respectively. When circumstances permit, the sleeves are conveniently formed as at 10A in Figure 6, with a single row of stitches 44. But where the panels of the head lining 1 require individual tailoring along the seam, the sleeves are created as at 10B in Figure 7, with two rows of stitches 45 and 46.

I claim:

1. Roof trim for a motor vehicle comprising a prefabricated flexible head lining, a plurality of pliable curved listing bars transversely disposed with respect to said lining, loops attached to said lining through which said listing bars pass, said flexible lining being fastened to said listing bars near their ends and equipped at its two side edges with longitudinally arranged cord means which engage said listing bar ends, and fixed guides for said cord means spaced from each other by a distance less than that between the opposite ends of said listing bars, said cord means being tensioned between said guides in order to bow the listing bars and thereby tauten said lining.

2. Roof trim as claimed in claim 1, in which the sides of the head lining stop short of the adjacent ends of said listing bars and said cord means pass through a hem along the side edges of the head lining and through eyelets presented by spring wire clips provided on the ends of the listing bars.

3. Motor vehicle roof trim according to claim 2, in which the effect of the cord means is supplemented by attaching thereto a vertical tension wire which is accommodated within the corresponding centre pillar of the vehicle.

4. Roof trim according to claim 1, in which said guide means consist of spaced holes in a wooden board to which the front edge zone of the head lining is attached, and this board is held in a slot provided across the windshield header panel.

5. Motor vehicle roof trim according to claim 1, in which the rear portion of the lining is formed with a cut-out conforming to the shape of the backlight opening of the vehicle, and an additional cord which is enclosed in a hem provided around the cut-out is pulled taut between anchorages on the vehicle body structure.

References Cited in the file of this patent
UNITED STATES PATENTS

| | | |
|---|---|---|
| 1,613,270 | Glover | Jan. 4, 1927 |
| 1,630,545 | Smith | May 31, 1927 |
| 2,001,136 | Holderbach | May 14, 1935 |
| 2,023,188 | Abbott | Dec. 3, 1935 |
| 2,118,563 | Mackay | May 24, 1938 |
| 2,239,318 | Haberstump | Apr. 22, 1941 |
| 2,390,193 | Tandetzke | Dec. 4, 1945 |